UNITED STATES PATENT OFFICE.

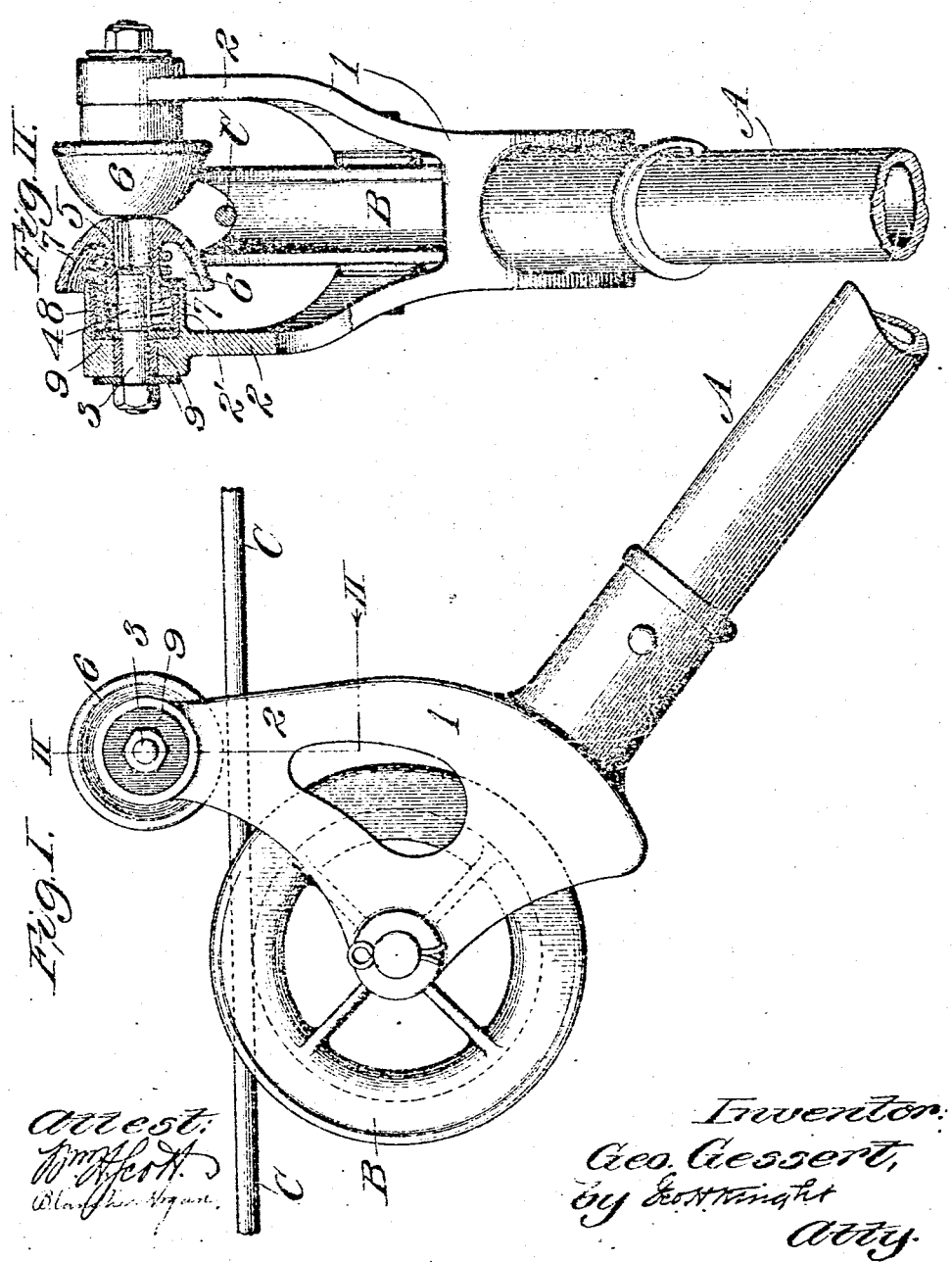

GEORGE GESSERT, OF EDWARDSVILLE, ILLINOIS.

TROLLEY-CATCHER.

No. 895,251.  Specification of Letters Patent.  Patented Aug. 4, 1908.

Application filed March 16, 1908. Serial No. 421,506.

*To all whom it may concern:*

Be it known that I, GEORGE GESSERT, a citizen of the United States of America, residing at Edwardsville, in the county of Madison and State of Illinois, have invented certain new and useful Improvements in Trolley-Catchers, of which the following is a full, clear, and exact description, reference being had to the accompanying drawing, forming part of this specification.

My invention relates to an attachment for the trolleys of electric railway cars, whereby the trolley wheel may always be retained in juxtaposition to the trolley wire even though it becomes separated therefrom, and will be caused to return to the wire without tension.

Figure I is a side elevation of the upper portion of a trolley equipped with my attachment. Fig. II is in part a rear elevation and in part a vertical section taken on line II—II, Fig. I.

In the accompanying drawings: A designates the pole of an ordinary trolley, and B the trolley wheel that is adapted to ride in contact with the trolley wire or conductor C.

I designates a harp or attachment carried by the trolley pole and in which the trolley wheel is journaled. This harp is provided with upwardly projecting extension arms 2, that extend upwardly from the main body of the harp and are of such length that their upper ends will be positioned above the trolley wire when the trolley wheel is in contact therewith. The extension arms 2 have mounted therein shafts or spindles 3 extending through horizontal openings in the arms and provided with journals 4 that extend beyond the inner faces of the arms and bear at their inner terminations annular ribs or shoulders 5, as seen in Fig. II.

6 are rollers in the shape of truncated cones, which are each provided with a sleeve loosely fitted to the journals of the shafts 3, in order that they may rotate upon said journals. These rollers oppose each other between the extension arms 2 and their sleeves are adapted to slide longitudinally upon the journals of the shafts 3, in order that they may approach and recede from each other, the rollers being limited in their movements towards each other by the provision of shoulders 7 formed upon the sleeves at the interior thereof adapted to engage the ribs 5 at the terminations of the journals of the shafts. 8 are springs surrounding the sleeves and interposed between the rear faces of the rollers and the extension arms 2, these springs being preferably partly inclosed by housings 2' that extend inwardly from the extension arms 2. The shafts 3 and the springs 8 are preferably separated from the extension arms 2 by insulating disk and annular members 9.

In the use of a trolley provided with my attachment, the rollers 6 normally occupy the positions illustrated in Fig. II, being located above the trolley wire and free of any action while the trolley wheel is in its normal position of contact with the trolley wire. In the event, however of the trolley wheel escaping from the trolley wire and moving downwardly, the rollers 6 are lowered into contact with the trolley wire against which they ride to prevent further descent of the trolley wheel thereby limiting the degree to which the trolley wheel may descend and cause the trolley wheel to be held in a central position beneath the trolley wire, in order that it will be again reinstated against the wire under the action of the usual spring supporting means connected to the trolley pole. The rollers 6 being backed by the springs 8, are free to recede upon the journals of the shafts 3 whenever occasion for the receding thereof is necessary, such, for instance, as in the passing of the hangers by which the trolley wire is supported, and in the lowering of the trolley from the trolley wire, or the replacement of the trolley wheel in contact with the trolley wire.

While I have shown and described my attachment as associated with the harp of a trolley, it is obvious that the attachment might be applied at any other suitable point in connection with the trolley pole.

I claim:

1. A trolley catcher comprising a pole, a harp having upwardly extending arms, journals having ribs at their inner ends and shafts journaled in the arms at their outer ends, truncated cone rollers having sleeves formed with interior shoulders loosely fitted to the journals and springs surrounding the journals and sleeves between the rollers and the arms.

2. A trolley catcher comprising a pole, a harp having upwardly extending arms formed with inwardly projecting housings, journals having ribs at their inner ends and shafts journaled in the arms at their outer ends, truncated cone rollers having sleeves formed with interior shoulders loosely fitted to the journals, and springs surrounding the journals and sleeves between the rollers and the arms.

GEORGE GESSERT.

In presence of—
    LILY ROST,
    H. G. COOK.